US010767910B2

(12) United States Patent
Diaz

(10) Patent No.: US 10,767,910 B2
(45) Date of Patent: Sep. 8, 2020

(54) REFRIGERATION CYCLE EJECTOR POWER GENERATOR

(71) Applicant: William J. Diaz, Napa, CA (US)

(72) Inventor: William J. Diaz, Napa, CA (US)

( * ) Notice: Subject to any disclaimer, the term of this patent is extended or adjusted under 35 U.S.C. 154(b) by 84 days.

(21) Appl. No.: 16/217,374

(22) Filed: Dec. 12, 2018

(65) Prior Publication Data

US 2020/0191108 A1 Jun. 18, 2020

(51) Int. Cl.
*F25B 9/08* (2006.01)
*F25B 1/08* (2006.01)
*F25B 9/06* (2006.01)
*F03B 1/04* (2006.01)
*F03B 17/00* (2006.01)

(52) U.S. Cl.
CPC .................. *F25B 9/08* (2013.01); *F03B 1/04* (2013.01); *F03B 17/005* (2013.01); *F25B 1/08* (2013.01); *F25B 9/06* (2013.01); *F25B 2341/0014* (2013.01); *F25B 2400/14* (2013.01)

(58) Field of Classification Search
CPC ...... F25B 1/06; F25B 1/08; F25B 9/06; F25B 9/08; F25B 2341/0014; F01D 15/005; F03B 1/04; F03B 17/005
See application file for complete search history.

(56) References Cited

U.S. PATENT DOCUMENTS

| 3,698,839 A * | 10/1972 | Distefano | F04C 28/24 |
| | | | 417/299 |
| 4,139,356 A * | 2/1979 | Hattori | F25B 47/022 |
| | | | 62/278 |
| 5,682,759 A * | 11/1997 | Hays | F03B 1/04 |
| | | | 62/402 |
| 6,782,709 B2 * | 8/2004 | Panin | B64D 13/06 |
| | | | 62/404 |
| 7,559,212 B2 * | 7/2009 | Bergander | F25B 1/06 |
| | | | 62/500 |
| 8,459,048 B2 * | 6/2013 | Eisenhour | F25B 9/06 |
| | | | 62/402 |
| 8,511,112 B2 * | 8/2013 | Kakuda | F25B 1/10 |
| | | | 62/498 |
| 9,372,014 B2 * | 6/2016 | Nagano | F25B 41/00 |
| 9,683,762 B2 * | 6/2017 | Kawano | F25B 1/06 |
| 2009/0165456 A1 * | 7/2009 | Masada | F01K 25/10 |
| | | | 60/531 |

(Continued)

*Primary Examiner* — Christopher R Zerphey
(74) *Attorney, Agent, or Firm* — Craig A. Simmermon

(57) ABSTRACT

Refrigeration cycle ejector power generator makes use of refrigerant in a refrigeration cycle to feed an ejector or injector within the refrigeration cycle causing the ejector to fire refrigerant at extremely high pressures and velocities into a turbine fan or blade that is sealed inside the refrigeration system and is connected to a generator in order to generate electricity. Refrigeration cycle ejector power generator comprises: a condenser, an expansion valve, an evaporator, a compressor, an ejector valve, a first ejector, a turbine, and a controller or computer. Refrigeration cycle ejector power generator is a refrigeration cycle with at least one ejector positioned in the refrigeration cycle that emits refrigerant at a high pressure and high velocity that is directed at a turbine, causing it to rotate, where this rotational energy may be used to turn a generator, thereby generating electricity.

8 Claims, 15 Drawing Sheets

(56) References Cited

U.S. PATENT DOCUMENTS

| | | | |
|---|---|---|---|
| 2013/0104593 A1* | 5/2013 | Occhipinti | F25B 41/00 |
| | | | 62/498 |
| 2015/0020534 A1* | 1/2015 | Zhang | F25B 1/06 |
| | | | 62/117 |
| 2016/0197534 A1* | 7/2016 | Walker | H02K 7/1823 |
| | | | 290/52 |
| 2018/0340713 A1* | 11/2018 | Dowdy, III | F25B 9/06 |

* cited by examiner

REFRIGERATION CYCLE EJECTOR POWER GENERATOR

BACKGROUND OF THE INVENTION

1. Field of the Invention

This invention relates to refrigeration technology including the refrigeration cycle and its components. This invention also relates to ejector technology, injector technology, or high-pressure nozzle technology, which are dual chambered ejectors or injectors that eject gas or liquid at extremely high pressures and velocities. Specifically, this invention uses refrigerant in a refrigeration cycle to feed an ejector or injector within the refrigeration cycle causing the ejector to fire refrigerant at extremely high pressures and velocities into a turbine fan or blade that is sealed inside the refrigeration system and is connected to a generator in order to generate electricity.

2. Description of Related Art

There are many types of refrigerants and refrigeration cycles in the prior art. Most, if not all, refrigerants in the prior art are referred to as Freon® which is a registered trademark of the DuPont company. Freon® type refrigerants are fluorocarbons. All fluorocarbons are assigned an R number, which is determined systematically according to molecular structure. Fluorocarbons are being phased out because of their high ozone depletion effects. As a replacement to fluorocarbons, other refrigerants are currently being used, such as ammonia, sulfur dioxide, and non-halogenated hydrocarbons. This invention does not use a fluorocarbon or any other standard type of refrigerant. Instead, this invention uses carbon dioxide or $CO_2$ as a refrigerant. Carbon dioxide is used because it has zero effects on the ozone layer. Carbon dioxide has a global warming potential of one. Carbon dioxide is nonflammable, nontoxic, and economically readily available at low cost. Carbon dioxide can generate much greater pressures and velocities of fluid ejectment from an ejector, where greater ejectment pressures and velocities yield greater rotation speeds of the turbine fan, which leads to more efficient power production.

Refrigeration cycles operate by cycling a refrigerant through a continuous cycle. During one cycle, the refrigerant changes from liquid to gas, then gas to liquid. A large degree of thermodynamic efficiency is gained from the phase changes of the refrigerant in the refrigeration cycles. Even more thermodynamic efficiency can be gained when the refrigerant exists as a super critical liquid or fluid. All substances turn into a supercritical fluid at a temperature and pressure above the substance's critical point. In the supercritical state, the substance does not exist as a distinct liquid state or a distinct gas state. Rather, by definition, supercritical fluids behave like a liquid and a gas simultaneously. This invention cycles carbon dioxide in a supercritical state through a refrigeration cycle. Carbon dioxide does not reach a supercritical state until at a pressure of 74 atmospheres and above, along with a temperature of 31.1 Celsius and above. Therefore, the components of the refrigeration cycle of this invention must be able to withstand refrigerant pressures of 74 atmospheres and above, which is a very high pressure requirement. Additionally, the components of the refrigeration cycle of this invention must be able to withstand refrigerant temperatures of 31.1 Celsius and above, which is not an extremely high temperature requirement. The use of carbon dioxide as a refrigerant at the supercritical state requires certain modifications and improvements to components in the refrigeration cycle to allow for proper functioning of the refrigeration cycle and generator. One caveat of using supercritical carbon dioxide in a refrigeration cycle is that high pressures and velocities can cause carbon dioxide to flow through the refrigeration cycle at velocities that are greater than the speed of sound thereby causing sonic booms or vibrations in the refrigeration cycle components, which could be catastrophic to the whole system. Another caveat is that the turbine must also be able to withstand pressures of 74 atmospheres and above, since it is position within the refrigeration cycle.

There are many ejectors or injectors in the prior art. This invention uses novel, specially shaped ejectors or injectors to accommodate the properties of carbon dioxide and to yield high-pressure and high-velocity effluent fluid from the ejector, which, in turn, produces efficient rotation of the turbine or fan and efficient power production. The novel and specially shaped ejectors or injectors of this invention produce high-pressure high-velocity fluid flows for efficient power production but do not yield velocities that are greater than the speed of sound thereby preventing sonic booms in the flow of refrigerant. The novel and specially shaped ejectors or injectors of this invention are designed to curtail sonic booms or sonic conditions in effluent fluid flow of the ejector or injector.

BRIEF SUMMARY OF THE INVENTION

It is an aspect of refrigeration cycle ejector power generator to include a refrigeration cycle apparatus that cycles carbon dioxide in the super critical state as the refrigerant.

It is an aspect of refrigeration cycle apparatus to be capable of containing refrigerant under very high pressures ranging from 74 atmospheres and above.

It is an aspect of refrigeration cycle ejector power generator to include at least one ejector or injector positioned inline with the refrigerant of the refrigeration cycle apparatus.

It is an aspect of at least one ejector or injector to be capable of containing refrigerant under very high pressures ranging from 74 atmospheres and above.

It is an aspect of at least one ejector to have a special shape or design that helps curtail sonic conditions in the cycling super critical state carbon dioxide.

It is an aspect of refrigeration cycle ejector power generator to include a turbine positioned inline with the refrigerant of the refrigeration cycle apparatus.

It is an aspect of generator to be capable of containing refrigerant under very high pressures ranging from 74 atmospheres and above.

It is an aspect of at least one ejector or injector to spray refrigerant or push compressed refrigerant onto the turbine thereby causing the turbine to rotate.

DEFINITION LIST

| Term | Definition |
| --- | --- |
| 2 | Refrigeration Cycle Ejector Power Generator |
| 4 | Piping or Tubing with Primarily Liquid Refrigerant (solid lines) |
| 6 | Piping or Tubing with Primarily Gaseous Refrigerant (dashed lines) |
| 8 | Electrical Wiring (stepped lines) |
| 10 | Condenser |
| 12 | Primary entry Port on Condenser |
| 13 | Secondary Entry Port |
| 14 | Primary exit Port on Condenser |
| 15 | Secondary Exit Port on Condenser |
| 16 | Condenser Fan or Pump |
| 18 | Heated Air or Water |
| 20 | Separator |
| 22 | Pressure Transmitter |
| 24 | Pressure Gauge |
| 26 | Temperature Gauge |
| 35 | Expansion Valve |
| 40 | Evaporator |
| 42 | Primary entry Port on Evaporator |
| 44 | Primary exit Port on Evaporator |
| 45 | Secondary Exit Port on Evaporator |
| 46 | Evaporator Fan or Pump |
| 48 | Cooled Air or Water |
| 50 | Accumulator |
| 60 | Compressor |
| 62 | Primary Entry Port on Compressor |
| 64 | Primary Exit Port on Compressor |
| 65 | Secondary Exit Port on Compressor |
| 66 | Ejector Valve |
| 68 | Condenser Bypass Valve |
| 70 | First Ejector |
| 75 | Second Ejector |
| 76 | High Pressure Chamber |
| 77 | Primary Entry Port |
| 78 | Low Pressure Chamber |
| 79 | Secondary Entry Port |
| 81 | High Pressure Influent Refrigerant |
| 82 | Low Pressure Influent Refrigerant |
| 83 | Nozzle |
| 84 | Mixing Chamber |
| 85 | Diffuser |
| 86 | Effluent Refrigerant |
| 87 | Exit Port |
| 90 | Turbine |
| 91 | Fan |
| 92 | Fan Shaft |
| 93 | Fan Shaft Seal |
| 94 | Generator |
| 95 | Controller or Computer |
| 100 | Battery |

DETAILED DESCRIPTION OF THE INVENTION

Figure 1:
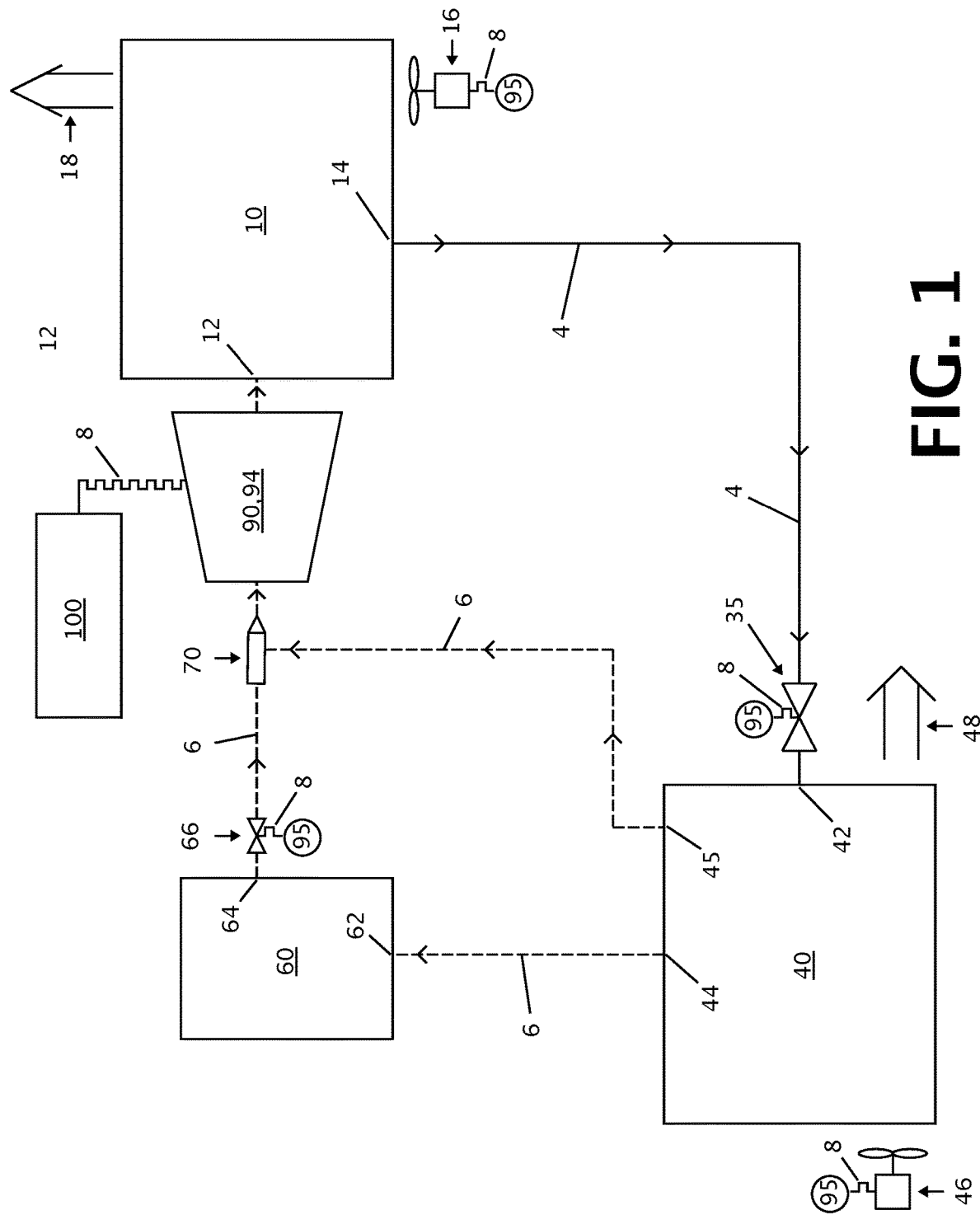
FIG. 1 is a diagram of a first mode of refrigeration cycle ejector power generator with one ejector.

Refrigeration cycle ejector power generator 2 comprises: a condenser 10, an expansion valve 35, an evaporator 40, a compressor 60, an ejector valve 66, a first ejector 70, a turbine 90, and a controller or computer 95, as depicted in FIG. 1. Refrigeration cycle ejector power generator 2 is a refrigeration cycle with at least one ejector 70 positioned in the refrigeration cycle that emits refrigerant at a high pressure and high velocity that is directed at a turbine 90, causing it to rotate, where this rotational energy may be used to turn a generator 94, thereby generating electricity.

Condenser 10 is a device that condenses gas or vapor into a liquid by removing heat from the gas or vapor to cause it to condense into a liquid. A condenser 10 is a basic component of a refrigeration cycle. Condenser 10 is a containment vessel with a primary entry port 12 and a primary exit port 14. Primarily gaseous refrigerant flows into condenser 10 from primary entry port 12 and primarily liquid refrigerant flows out of condenser 10 from the primary exit port 14. The containment vessel has a heat exchanger, radiator, or coil. Heat is transmitted to the environment through the heat exchanger, radiator, or coil where a condenser fan or pump 16 blows cooler air or pumps cooler water from the environment through the heat exchanger, radiator, or coil to export heat to the environment. Heated air or water 18 is released into the environment. Environmental air or water must be cooler than the refrigerant in the condenser 10. Condenser 10 must be capable of containing refrigerant under very high pressures ranging from 74 atmospheres and above. Condenser 10 may be any known type of condenser such as an air coil, air fin, surface condenser, isolation condenser, laboratory condenser, or any other known type of condenser. Primary exit port 14 of condenser 10 is connected by piping or tubing 4 to the entry port on expansion valve 35. Condenser 10 and piping or tubing 4 must be capable of containing refrigerant under very high pressures ranging from 74 atmospheres and above.

Expansion valve 35 is a valve that controls or meters the amount of refrigerant released into the evaporator 40. An expansion valve 35 is sometimes referred to as a metering valve or a throttle valve. An expansion valve 35 is a basic component of a refrigeration cycle. Expansion valve 35 has an entry port, an exit port, and a temperature sensing bulb. The temperature sensing bulb is an isolated chamber filled with refrigerant which expands and contracts according to temperature and is linked to a mechanical valve. The expansion and contraction causes the mechanical valve to open as the temperature on the bulb increases and close as the temperature decreases, thereby metering refrigerant flow into the evaporator. Influent refrigerant to the expansion valve 35 is under high pressure. Effluent refrigerant from the expansion valve 35 is under low pressure. Expansion valve 35 may be any known type of expansion valve including an internally equalized valve or an externally equalized valve. Expansion valve 35 must be calibrated to yield the desired flow rate of refrigerant in the refrigeration cycle and to insure that the velocity of refrigerant in the refrigeration cycle does not exceed the speed of sound at any point in the cycle. Alternately, expansion valve 35 may be an actuated valve that is electronically controlled. Expansion valve 35 may be any known type of actuated valve capable of regulating refrigerant flow that can withstand very high pressures ranging from 74 atmospheres and above. In this mode, expansion valve 35 is connected to controller or computer 95 by electrical wiring 8 to create electrical continuity there between. Controller or computer 95 sends electrical signals to expansion valve 35 through electrical wiring 8 that function to control the expansion valve 35 and the degree to which expansion valve 35 is open or closed. The exit port of expansion valve 35 is connected by piping or tubing 6 to the primary entry port 42 on evaporator 40. Expansion valve 35 and piping or tubing 6 must be capable of containing refrigerant under very high pressures ranging from 74 atmospheres and above.

Evaporator 40 is a device that boils or evaporates liquid into a gas or vapor by adding heat to the liquid to cause it to evaporate into a gas or vapor. An evaporator 40 is a basic component of a refrigeration cycle. Evaporator 40 is a containment vessel with a primary entry port 42, a primary exit port 44, and a secondary exit port 45. Primarily liquid refrigerant cooled by the condenser 10 flows through expansion valve 35, through primary entry port 42, and into evaporator 40, where the refrigerant is boiled to vapor or gas. Refrigerant pressure is reduced from passing through expansion valve 35 thereby lowering the boiling point of the refrigerant. Primarily gaseous refrigerant then flows out of evaporator 40, exiting from primary exit port 44. The containment vessel has a heat exchanger, radiator, or coil. Heat is transmitted to the refrigerant from the heat exchanger, radiator, or coil where an evaporator fan or pump 16 blows warmer air or warmer water through the heat exchanger, radiator, or coil to import heat into the refrigerant. Cooled air or water 48 is released into the environment. Environmental air or water must be warmer than the refrigerant in the evaporator 40. Evaporator 40 must be capable of containing refrigerant under very high pressures ranging from 74 atmospheres and above. Evaporator 40 may be any known type of evaporator such as an air coil, air fin, surface evaporator, isolation evaporator, laboratory evaporator, or any other known type of evaporator. Primary exit port 44 of evaporator 40 is connected by piping or tubing 6 to the primary entry port 62 on compressor 60. Secondary exit port 45 of evaporator 40 is connected by piping or tubing 6 to the secondary entry port 79 on first ejector 70. Evaporator 40 and piping or tubing 6 must be capable of containing refrigerant under very high pressures ranging from 74 atmospheres and above.

Compressor 60 is a device that increases the pressure of a gas by reducing its volume. Compressor 60 uses a mechanical mechanism to pump gaseous refrigerant into a smaller volume thereby increasing its pressure. A compressor 60 is a basic component of a refrigeration cycle. Compressor 60 is a containment vessel with a primary entry port 62 and a primary exit port 64. Gaseous refrigerant from evaporator 40 flows into compressor 60 from primary entry port 62 and pressurized gaseous refrigerant flows out of compressor 60 from the primary exit port 64. The pressurization of the gaseous refrigerant causes the refrigerant to heat up. Compressor 60 must be capable of containing refrigerant under very high pressures ranging from 74 atmospheres and above. Influent refrigerant to the compressor 60 is under low pressure. Effluent refrigerant from compressor 60 is under high pressure. Compressor 60 may be any known type of evaporator such as a reciprocating compressors, ionic liquid piston compressor, rotary screw compressor, rotary vane compressor, rolling piston compressor, scroll compressor, diaphragm compressor, dynamic compressor, or any other known type of compressor. Primary exit port 64 of compressor 60 is connected by piping or tubing 6 to the entry port on ejector valve 66. Compressor 60 and piping or tubing 6 must be capable of containing refrigerant under very high pressures ranging from 74 atmospheres and above.

Ejector valve 66 is an actuated valve that is controlled by the controller or computer 95. Ejector valve 66 is a valve that regulates, directs, or controls the flow of refrigerant by opening, closing, or partially obstructing the passageway through the valve. Ejector valve 66 has an entry port and an exit port. Ejector valve 66 may be any known type of actuated valve capable of regulating refrigerant flow that can withstand very high pressures ranging from 74 atmospheres and above. Ejector valve 66 is connected to controller or computer 95 by electrical wiring 8 to create electrical continuity there between. Controller or computer 95 sends electrical signals to ejector valve 66 through electrical wiring 8 that function to control the ejector valve 66 and the degree to which ejector valve 66 is open or closed. Ejector valve 66 regulates or controls the flow of refrigerant flowing out of primary exit port 64 on compressor 60 and into the primary entry port 77 on first ejector 70. Exit port of ejector valve 66 is connected by piping or tubing 6 to the primary entry port 77 on first ejector 70. Ejector valve 66 and piping or tubing 6 must be capable of containing refrigerant under very high pressures ranging from 74 atmospheres and above.

Figure 13:
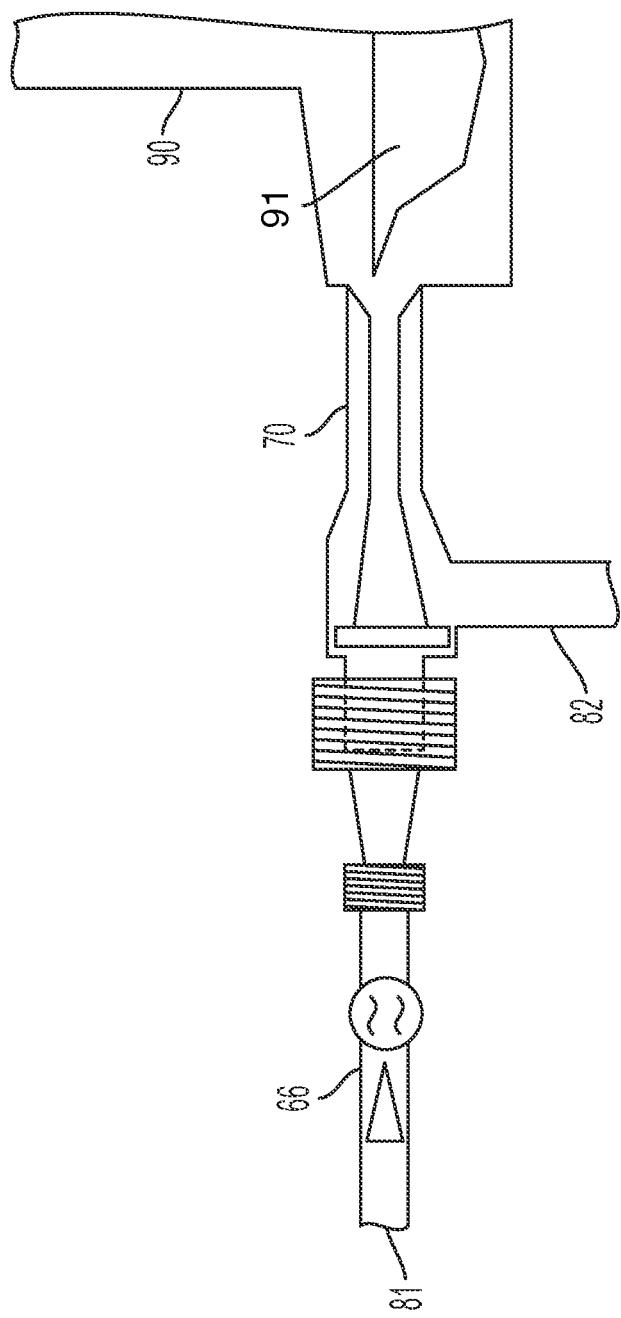
FIG. 13 is a cross sectional view of a segment of refrigeration cycle ejector power generator with one ejector.

First ejector 70 is an ejector comprising: a primary entry port 77, a high pressure chamber 76, a secondary entry port 79, a low pressure chamber 78, a nozzle 83, a mixing chamber 84, a diffuser 85, and an exit port 87. First ejector 70 is an oblong shaped or cylindrical shaped fitting with open ends. First ejector 70 has a longitudinal axis, an upstream end, a side, a downstream end, an interior, and an exterior. The upstream end is open and is designated as the primary entry port 77. The downstream end is open and is designated as the exit port 87. Side is a rigid oblong shaped or cylindrical shaped member that connects primary entry port 77 to exit port 87. Side is a containment barrier with the exception of one port, which is designated as secondary entry port 79. Secondary entry port 79 is a port or opening in the side of first ejector 70. Secondary entry port 79 of first ejector 70 is connected by piping or tubing to secondary exit port 45 on evaporator 40. Exit port 87 on first ejector 70 is connected by piping or tubing 6 to entry port on turbine 90, as depicted in FIG. 13. First ejector 70 and piping or tubing must be capable of containing refrigerant under very high pressures ranging from 74 atmospheres and above.

Nozzle 83 is a nozzle. Nozzle 83 is a rigid oblong member with one conical shaped end or tapered cylindrical end. Both ends of nozzle 83 are open. Nozzle 83 has a longitudinal axis, a large end, a small end, an interior, and an exterior. Nozzle 83 is located inside first ejector 70 and positioned with its longitudinal axis coincident with that of first ejector 70. The large end of nozzle 83 is positioned toward the upstream end of first ejector 70, and the small end of nozzle 83 is positioned toward the downstream end of first ejector 70, so that the conical shape tapers inward in the direction of the flow of refrigerant. Nozzle 83 functions to direct the flow of refrigerant into a more narrow stream. Nozzle 83 separates the high pressure chamber 76 from the low pressure chamber 78 within first ejector 70.

High pressure chamber 76 is a chamber within the interior of first ejector 70 located at the upstream end of first ejector 70. High pressure chamber 76 is a rigid oblong chamber with one conical shaped end or tapered cylindrical end. High pressure chamber 76 has a first end, a middle, and a tapered end. High pressure chamber 76 is essentially the interior of nozzle 83. First end is an open cylindrical shaped end. Tapered end is an open conical shaped or tapered end. High pressure chamber 76 is defined by the primary entry port 77 at its first end, the interior of nozzle 83 in the middle, and the interior of the tapered end of nozzle 83 at its tapered end. High pressure chamber 76 is fed through primary entry port 77 with high pressure influent refrigerant 81 from exit port on ejector valve 66.

Low pressure chamber 78 is a chamber within the interior of first ejector 70 located in the middle of first ejector 70 and adjacent to high pressure chamber 76. Low pressure chamber 78 is a rigid oblong chamber with one conical shaped end or tapered cylindrical end. Low pressure chamber 78 has a first end, a middle, and a tapered end. Low pressure chamber 78 surrounds the small end of nozzle 83 so that the small end of nozzle 83 is completely within and inside of low pressure chamber 78. Low pressure chamber 78 is defined by the exterior of nozzle 83 at its first end, the interior of first ejector 70 in the middle, and the tapered interior of first ejector 70 at its tapered end. The interior of first ejector 70 tapers at this location in the same direction as nozzle 83. The tapered end of low pressure chamber 78 surrounds the tapered end of high pressure chamber 76 as depicted. There is a port or opening in the middle of low pressure chamber 78. This port or opening is the secondary entry port 79. Low pressure influent refrigerant 82 from secondary exit port 45 on evaporator 40 flows into low pressure chamber 78 through secondary entry port 79. During operation, the pressure in high pressure chamber 76 is greater than that of low pressure chamber 78.

Mixing chamber 84 is a chamber within the interior of first ejector 70 located in the middle of first ejector 70 and adjacent to low pressure chamber 78. Mixing chamber 84 is a rigid cylindrical chamber with a first end and a second end. First and seconds ends are both open. Mixing chamber 84 is defined by the tapered end of low pressure chamber 78 at its first end, the interior of first ejector 70 in the middle, and the small end of diffuser 85 at its second end.

Diffuser 85 is a chamber within the interior of first ejector 70 located at the downstream end of first ejector 70 and adjacent to mixing chamber 84. Diffuser 85 is a rigid conical shaped chamber or tapered cylindrical chamber with a small end and a large end. Small end and large end are both open. The small end of diffuser is contiguous with the second end of mixing chamber 84. The large end of diffuser 85 is exit port 87. Diffuser 85 functions to direct the flow of refrigerant outward into a more wide stream. Exit port 87 on first ejector 70 is connected by piping or tubing 6 to entry port on turbine 90, as depicted in FIG. 13. Piping or tubing 6 must be capable of containing refrigerant under very high pressures ranging from 74 atmospheres and above. High pressure and high velocity effluent refrigerant 86 from first ejector 70 is directed at fan 91 causing it to rotate. Rotation of fan 91 causes rotation of fan shaft 92 thereby causing rotation of generator 94.

First ejector 70 functions to emit high pressure and high velocity effluent refrigerant 86, which is used to rotate turbine 90. The operating principle is that pressure energy in the influent refrigerant 81 is converted into velocity energy by adiabatic expansion of the fluid upon exiting the high pressure chamber 76 or nozzle 83, causing a pressure drop, which creates a low-pressure zone in the low pressure chamber 78, just upstream of the mixing chamber 84, where this low-pressure zone sucks fluid in through the secondary entry port 79, then the two fluids mix in the mixing chamber 84, which causes a dramatic increase in fluid velocity, where the high velocity fluid then enters the diffuser 85, which decreases fluid velocity and increases fluid pressure, thereby emitting high pressure and high velocity effluent refrigerant 86. Most ejectors in the prior art have much longer diffusers than those of this invention and therefore emit fluid with much greater pressures and much lower velocities. Most ejector applications require high pressure and do not require high velocity. First ejector 70 is specially designed to yield a high pressure and a high velocity fluid which functions to created more efficient rotation of turbine 90.

Figure 15:
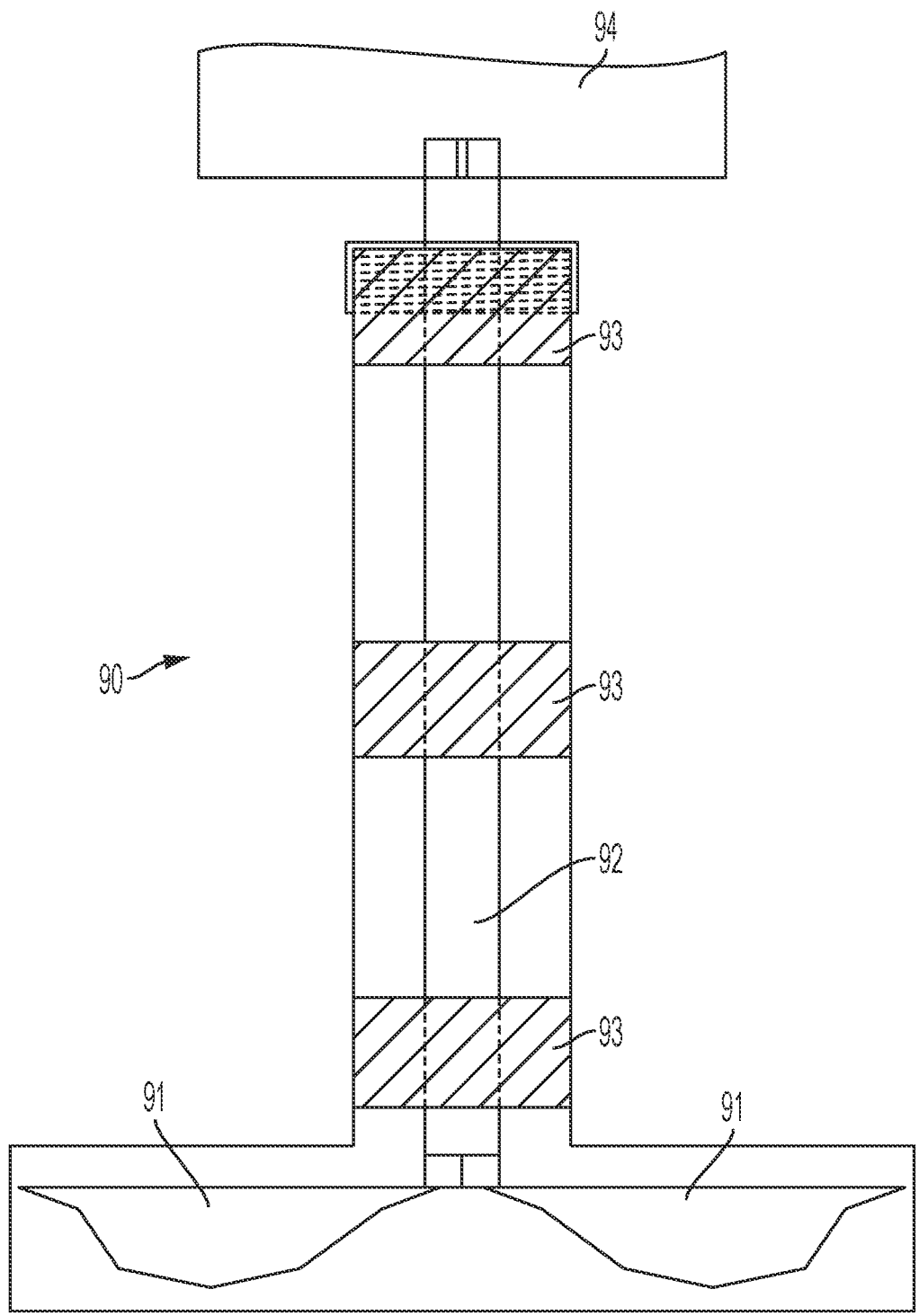
FIG. 15 is a cross sectional view of the turbine.
Figure 16:
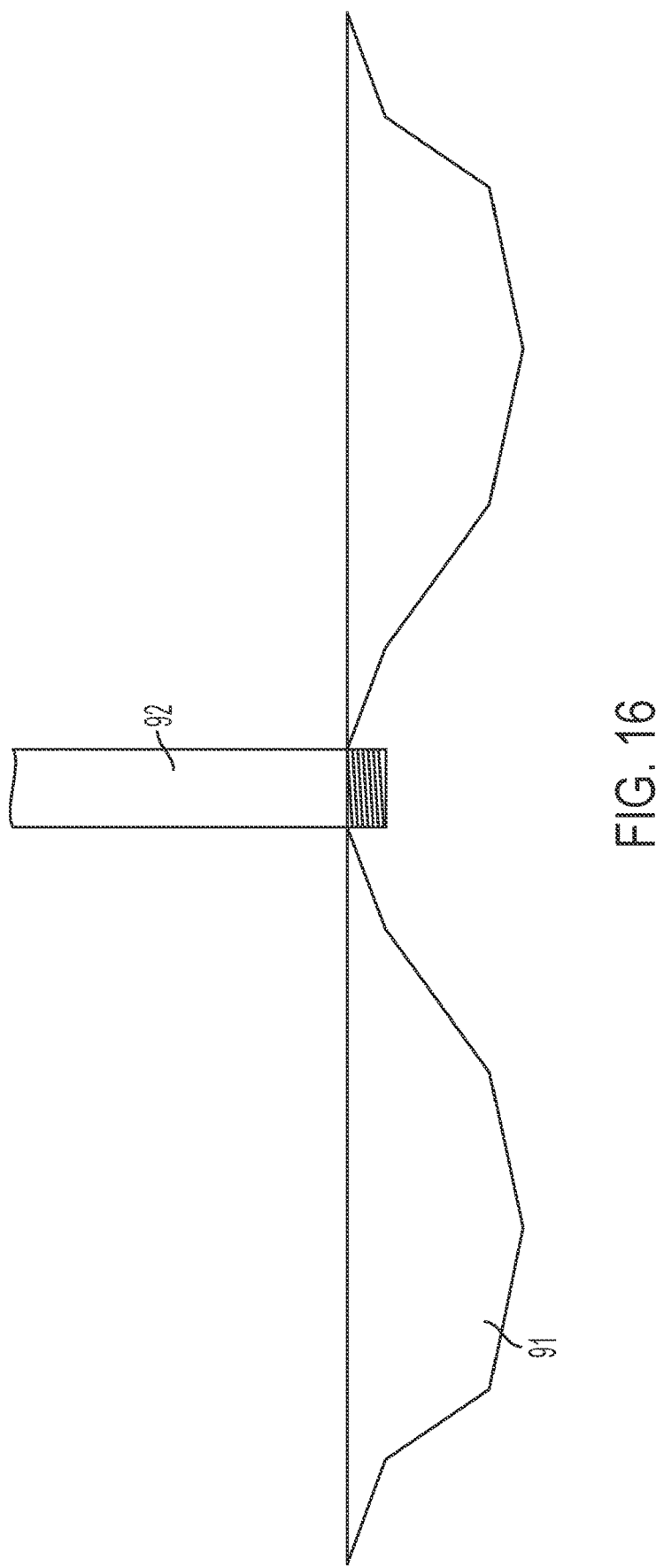
FIG. 16 is a cross sectional view of the turban fan.

Turbine 90 is a sealed vessel or containment vessel that is capable of containing high pressure refrigerant. Turbine 90 comprises: a fan 91, a fan shaft 92, and at least one fan shaft seal 93. Sealed vessel or containment vessel contains fan 91. Fan 91 is rigidly attached to fan shaft 92. A cross sectional view of turbine 90 is depicted in FIG. 15. Turbine 90 has an entry port and an exit port. Turbine entry port is connected by piping or tubing to exit port 87 on first ejector 70 or second ejector 75. Exit port on turbine 90 is connected by piping or tubing 6 to primary entry port 12 on condenser 10. Turbine 90 and piping or tubing 6 must be capable of containing refrigerant under very high pressures ranging from 74 atmospheres and above. Fan 91 is an arrangement of vanes or blades, which are acted upon by the flow of effluent refrigerant 86 from first ejector 70. A cross sectional view of fan 91 is depicted in FIG. 16. Fan 91 may be any known type of fan. Fan 91 may be an impeller, propeller, rotor, runner, or similar. Fan shaft 92 is a shaft or rigid solid cylindrical member. Fan shaft 92 has a first end and a second end. The first end of fan shaft 92 is rigidly attached to fan 91 or to each vane or blade of fan 91. The second end of fan shaft 92 is rigidly attached to generator 94. Fan shaft 92 extends through at least one fan shaft seal 93. At least one fan shaft seal 93 is a seal or bearing that separates the first end of fan shaft 92 from the second end of fan shaft 92. At least one fan shaft seal 93 is a seals around fan shaft 92 and allows rotation of fan shaft 92 without leaking through the seal. The first end of fan shaft 92 is positioned in a high pressure environment. The second end of fan shaft 92 is position in a low pressure environment or atmospheric pressure environment. At least one fan shaft seal 93 functions to keep the high pressure refrigerant contained within turbine 90 and to prevent leakage of refrigerant into generator 94. Generator 94 is located outside of the refrigeration cycle, in regular pressure environment or atmospheric pressure environment. In best mode, turbine 90 comprises three fan shaft seals 93 in order to contain the very high pressure refrigerant within the sealed vessel or containment vessel of turbine 90. High pressure and high velocity effluent refrigerant 86 from first ejector 70 is directed at fan 91 causing it to rotate. Rotation of fan 91 causes rotation of fan shaft 92 thereby causing rotation of generator 94.

Note that the refrigeration cycle consists of a high pressure portion and a low pressure portion. The high pressure portion spans from the compressor 60 to the expansion valve 35 and all components in between. The low pressure portion spans from the expansion valve 35 to the compressor 60 and all components in between.

Generator 94 is a power generator. Generator 94 is a device that converts mechanical energy into electrical power by spinning a rotor spinning inside of a stator. Generator 94 may be any known type of generator. Generator 94 is connected by electrical wiring 8 to a battery 100. Battery 100 is an electrical battery. Battery 100 may be any known type of electrical battery.

Controller or computer 95 is a controller or computer. Controller or computer 95 comprises an integrated circuit with has a central processing unit and memory. Controller or computer 95 may be any known type of integrated circuit or central processing unit. Controller or computer 95 must be programmed with custom software designed to properly operate refrigeration cycle ejector power generator 2.

Figure 2:
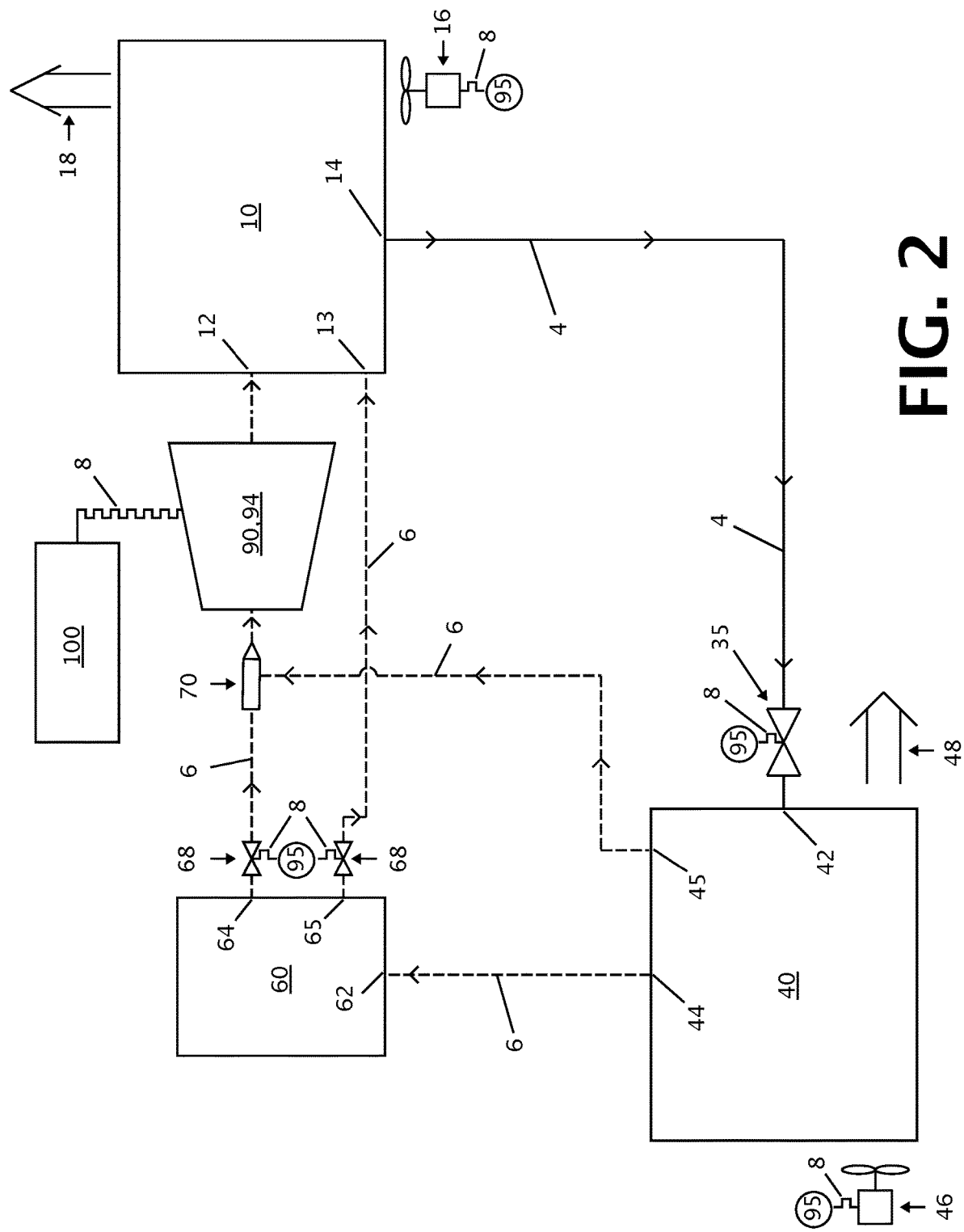
FIG. 2 is a diagram of a second mode of refrigeration cycle ejector power generator with one ejector and a condenser bypass valve.

Refrigeration cycle ejector power generator 2 may further comprise: a secondary exit port 65 on compressor 60, a condenser bypass valve 68, and a secondary entry port 13 on condenser 10, as depicted in FIG. 2. Secondary exit port 65 is a second exit port in compressor 60. Secondary entry port 13 is a second entry port in Condenser 10. Condenser bypass valve 68 is an actuated valve that is controlled by the controller or computer 95. Condenser bypass valve 68 is a valve that regulates, directs, or controls the flow of refrigerant by opening, closing, or partially obstructing the passageway through the valve. Condenser bypass valve 68 has an entry port and an exit port. Condenser bypass valve 68 may be any known type of actuated valve capable of regulating refrigerant flow that can withstand very high pressures ranging from 74 atmospheres and above. Condenser bypass valve 68 is connected to controller or computer 95 by electrical wiring 8 to create electrical continuity there between. Controller or computer 95 sends electrical signals to Condenser bypass valve 68 through electrical wiring 8 that function to control the condenser bypass valve 68 and the degree to which condenser bypass valve 68 is open or closed. Secondary exit port 65 on compressor 60 is connected by piping or tubing 6 to the entry port on condenser bypass valve 68. Exit port on condenser bypass valve 68 is connected by piping or tubing 6 to a secondary entry port 13 on condenser 10. Piping or tubing 6 must be capable of containing refrigerant under very high pressures ranging from 74 atmospheres and above.

This arrangement helps regulate or control the pressure of refrigerant in compressor 60 and in whole refrigeration cycle. The primary or majority flow of refrigerant exiting from compressor 60 flows through ejector valve 66 and first ejector 70. The addition of condenser bypass valve 68 provides a bypass flow path or safety valve flow path for the direct flow of refrigerant from the compressor 60 to the condenser 10, thereby bypassing first ejector 70. This safety valve flow path would open and be used if and when the pressure in compressor 60 surpasses a maximum setting. There is a maximum pressure that would cause sonic conditions in the refrigerant and sonic booms in the refrigeration cycle. The maximum pressure setting of compressor 60 would be set to prevent such a sonic condition. This arrangement would require a pressure gauge in compressor 60 that is connected by electrical wiring 8 to controller or computer 95.

Figure 3:
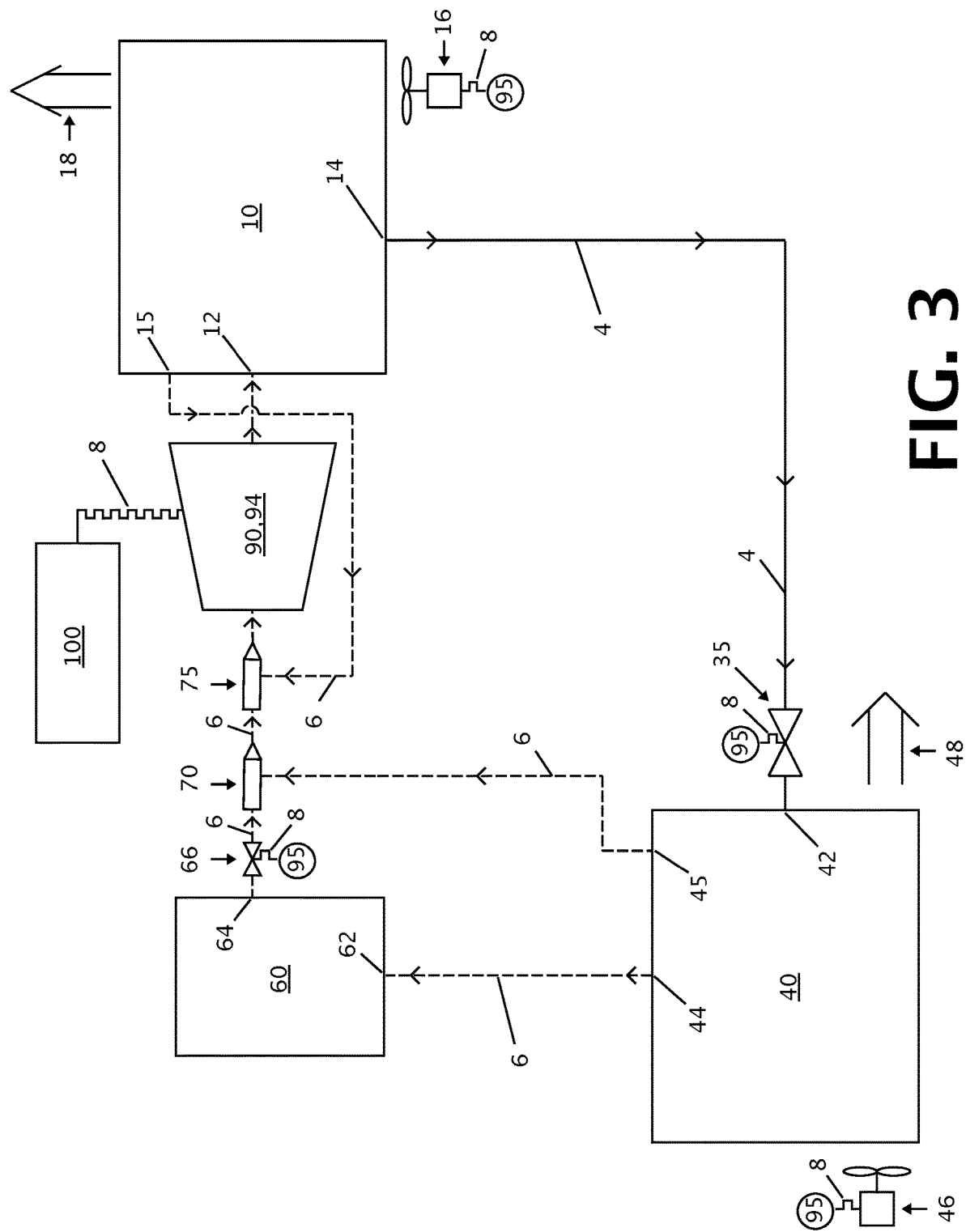
FIG. 3 is a diagram of a third mode of refrigeration cycle ejector power generator with two ejectors.
Figure 4:
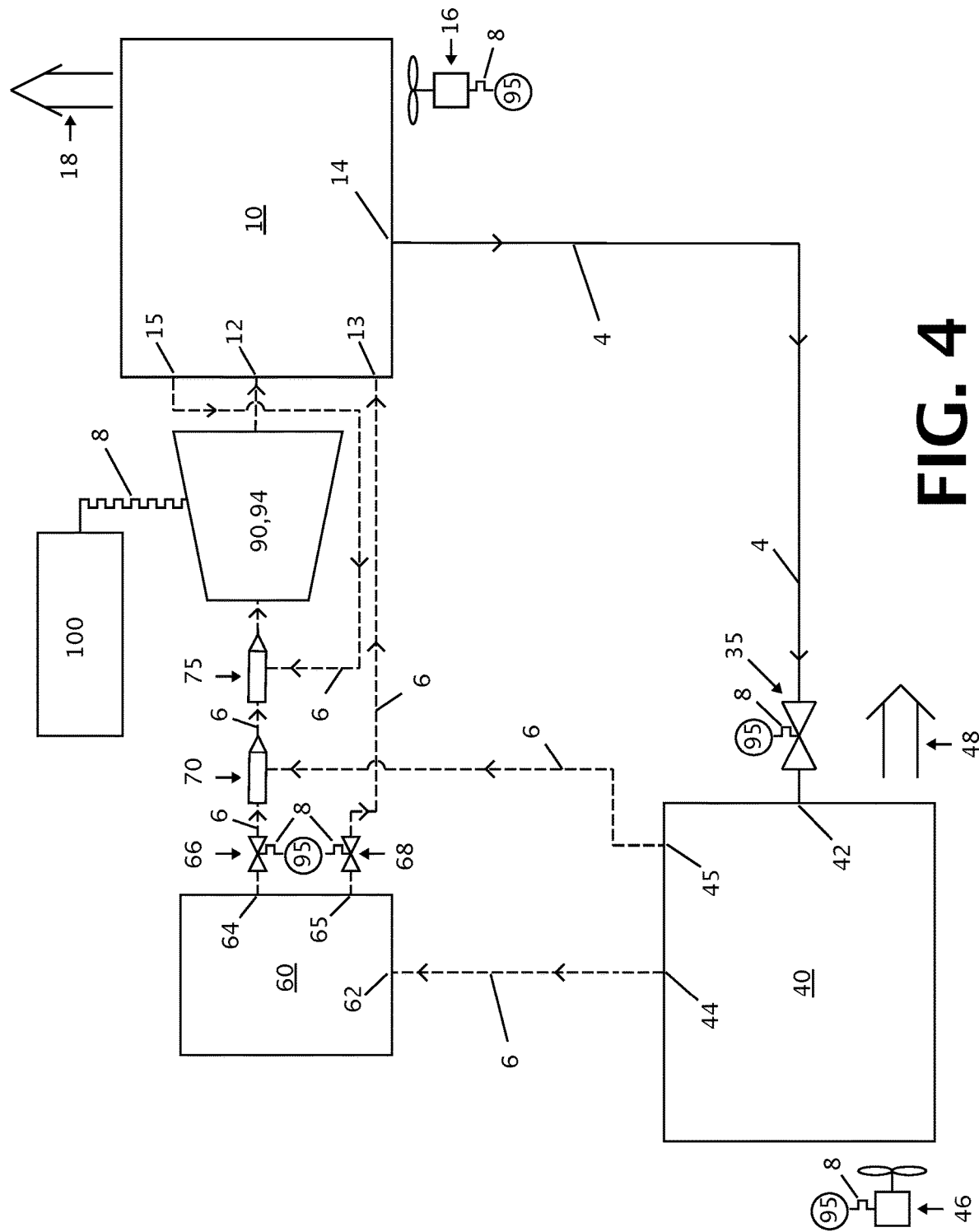
FIG. 4 is a diagram of a fourth mode of refrigeration cycle ejector power generator with two ejectors and a condenser bypass valve.

Refrigeration cycle ejector power generator 2 may further comprise: a second ejector 75 and a secondary exit port 15 on condenser 10, as depicted in FIGS. 3 and 4. In this configuration, the effluent refrigerant from first ejector 70 is the influent refrigerant of second ejector 75. This two ejector configuration produces greater pressures and velocities of refrigerant than those of single ejector configurations, thereby increasing the efficiency of power production.

Secondary exit port 15 is a second exit port in condenser 10. Secondary exit port 15 is located above primary exit port 14 and in a position on condenser 10 where the contained refrigerant is primarily gaseous as opposed to the bottom of condenser 10 where the contained refrigerant is primarily liquid.

Figure 14:
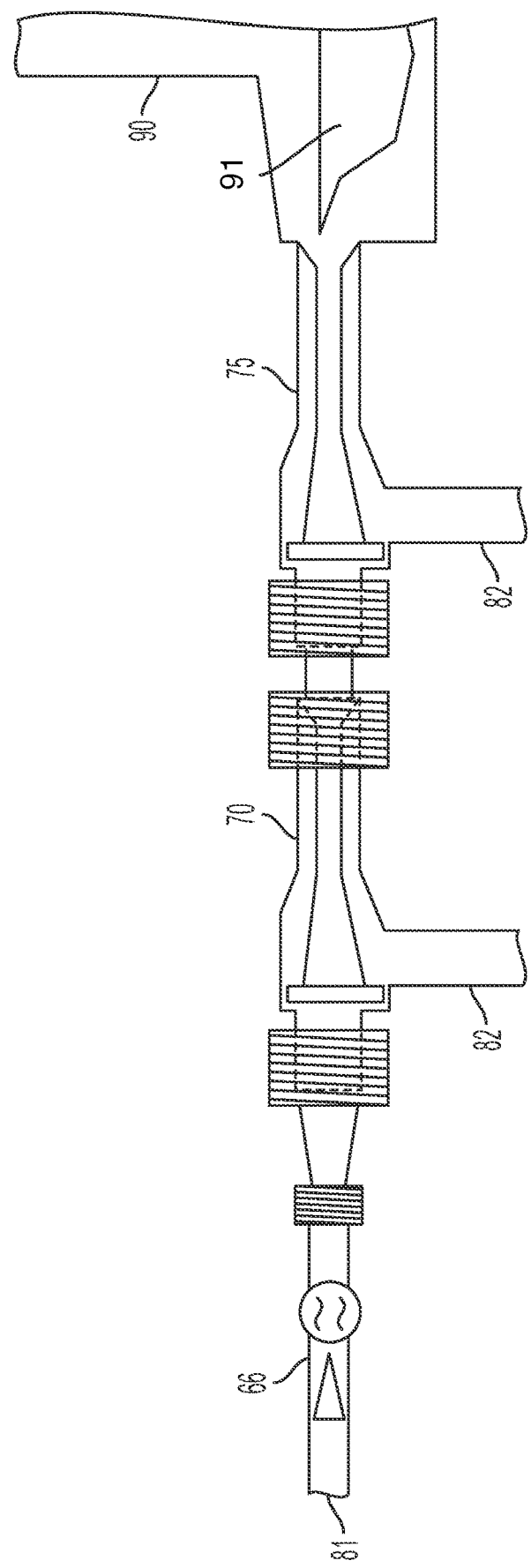
FIG. 14 is a cross sectional view of a segment of refrigeration cycle ejector power generator with two ejectors.

Second ejector 75 is an ejector comprising: a primary entry port 77, a high pressure chamber 76, a secondary entry port 79, a low pressure chamber 78, a nozzle 83, a mixing chamber 84, a diffuser 85, and an exit port 87. Second ejector 75 is an oblong shaped or cylindrical shaped fitting with open ends. Second ejector 75 has a longitudinal axis, an upstream end, a side, a downstream end, an interior, and an exterior. The upstream end is open and is designated as the primary entry port 77. The downstream end is open and is designated as the exit port 87. Side is a rigid oblong shaped or cylindrical shaped member that connects primary entry port 77 to exit port 87. Side is a containment barrier with the exception of one port, which is designated as secondary entry port 79. Secondary entry port 79 is a port or opening in the side of second ejector 75. Secondary entry port 79 on second ejector 75 is connected by piping or tubing to secondary exit port 15 on condenser 10. Exit port 87 of first ejector 70 is connected by piping or tubing 6 to the primary entry port 77 on second ejector 75, as depicted in FIG. 14. Second ejector 75 and piping or tubing must be capable of containing refrigerant under very high pressures ranging from 74 atmospheres and above.

Nozzle 83 is a nozzle. Nozzle 83 is a rigid oblong member with one conical shaped end or tapered cylindrical end. Both ends of nozzle 83 are open. Nozzle 83 has a longitudinal axis, a large end, a small end, an interior, and an exterior. Nozzle 83 is located inside second ejector 75 and positioned with its longitudinal axis coincident with that of second ejector 75. The large end of nozzle 83 is positioned toward the upstream end of second ejector 75, and the small end of nozzle 83 is positioned toward the downstream end of second ejector 75, so that the conical shape tapers inward in the direction of the flow of refrigerant. Nozzle 83 functions to direct the flow of refrigerant into a more narrow stream. Nozzle 83 separates the high pressure chamber 76 from the low pressure chamber 78 within second ejector 75.

High pressure chamber 76 is a chamber within the interior of second ejector 75 located at the upstream end of second ejector 75. High pressure chamber 76 is a rigid oblong chamber with one conical shaped end or tapered cylindrical end. High pressure chamber 76 has a first end, a middle, and a tapered end. High pressure chamber 76 is essentially the interior of nozzle 83. First end is an open cylindrical shaped end. Tapered end is an open conical shaped or tapered end. High pressure chamber 76 is defined by the primary entry port 77 at its first end, the interior of nozzle 83 in the middle, and the interior of the tapered end of nozzle 83 at its tapered end. High pressure chamber 76 is fed through primary entry port 77 with high pressure influent refrigerant 81, which is the effluent refrigerant from the exit port of first ejector 70.

Low pressure chamber 78 is a chamber within the interior of second ejector 75 located in the middle of second ejector 75 and adjacent to high pressure chamber 76. Low pressure chamber 78 is a rigid oblong chamber with one conical shaped end or tapered cylindrical end. Low pressure chamber 78 has a first end, a middle, and a tapered end. Low pressure chamber 78 surrounds the small end of nozzle 83 so that the small end of nozzle 83 is completely within and inside of low pressure chamber 78. Low pressure chamber 78 is defined by the exterior of nozzle 83 at its first end, the interior of second ejector 75 in the middle, and the tapered interior of second ejector 75 at its tapered end. The interior of second ejector 75 tapers at this location in the same direction as nozzle 83. The tapered end of low pressure chamber 78 surrounds the tapered end of high pressure chamber 76 as depicted. There is a port or opening in the middle of low pressure chamber 78. This port or opening is the secondary entry port 79. Low pressure chamber 78 is fed through secondary entry port 79 with low pressure influent refrigerant 82 from secondary exit port 15 on condenser 10. During operation, the pressure in high pressure chamber 76 is greater than that of low pressure chamber 78.

Mixing chamber 84 is a chamber within the interior of second ejector 75 located in the middle of second ejector 75 and adjacent to low pressure chamber 78. Mixing chamber 84 is a rigid cylindrical chamber with a first end and a second end. First and seconds ends are both open. Mixing chamber 84 is defined by the tapered end of low pressure chamber 78 at its first end, the interior of second ejector 75 in the middle, and the small end of diffuser 85 at its second end.

Diffuser 85 is a chamber within the interior of second ejector 75 located at the downstream end of second ejector 75 and adjacent to mixing chamber 84. Diffuser 85 is a rigid conical shaped chamber or tapered cylindrical chamber with a small end and a large end. Small end and large end are both open. The small end of diffuser is contiguous with the second end of mixing chamber 84. The large end of diffuser 85 is exit port 87. Diffuser 85 functions to direct the flow of refrigerant outward into a more wide stream. Exit port 87 on second ejector 75 is connected by piping or tubing 6 to entry port on turbine 90, as depicted in FIG. 14. Piping or tubing 6 must be capable of containing refrigerant under very high pressures ranging from 74 atmospheres and above. High pressure and high velocity effluent refrigerant 86 from second ejector 75 is directed at fan 91 causing it to rotate. Rotation of fan 91 causes rotation of fan shaft 92 thereby causing rotation of generator 94.

Second ejector 75 functions to emit high pressure and high velocity refrigerant 86, which is used to rotate turbine 90. The operating principle is that pressure energy in the influent refrigerant 81 is converted into velocity energy by adiabatic expansion of the fluid upon exiting the high pressure chamber 76 or nozzle 83, causing a pressure drop, which creates a low-pressure zone in the low pressure chamber 78, just upstream of the mixing chamber 84, where this low-pressure zone sucks fluid in through the secondary entry port 79, then the two fluids mix in the mixing chamber 84, which causes a dramatic increase in fluid velocity, where the high velocity fluid then enters the diffuser 85, which decreases fluid velocity and increases fluid pressure, thereby emitting high pressure and high velocity effluent refrigerant 86. Most ejectors in the prior art have much longer diffusers than those of this invention and therefore emit fluid with much greater pressures and much lower velocities. Most ejector applications require high pressure and do not require high velocity. Second ejector 75 is specially designed to yield a high pressure and a high velocity fluid which functions to created more efficient rotation of turbine 90.

Figure 10:
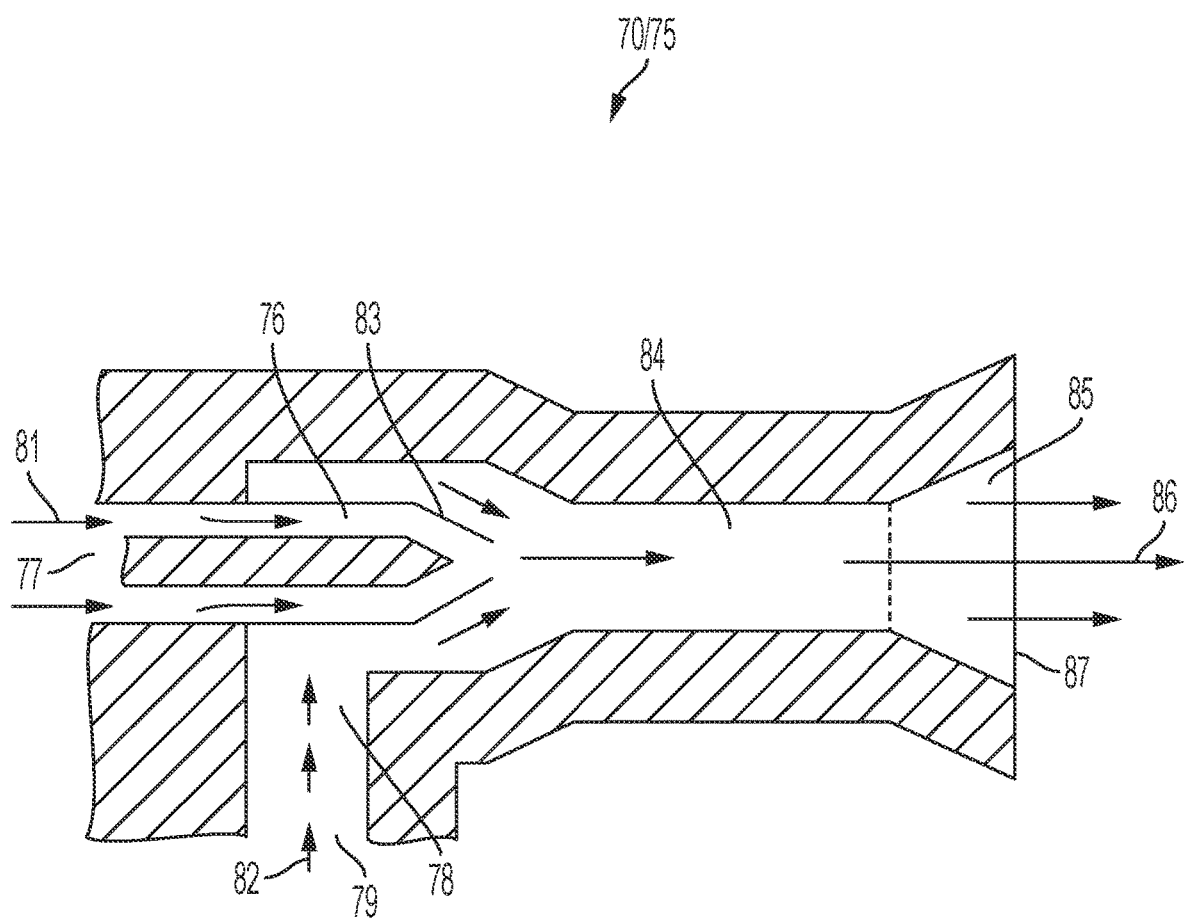
FIG. 10 is a cross sectional view of a specialized ejector.

First or second ejector 70,75 may include a nozzle 83 with a specialized shape as depicted in FIG. 10. Nozzle 83 with a specialized shape includes a center section. Center section is a rigid oblong member with at least one conical shaped end. Center section is position in the interior of nozzle 83. Center section has a first end, a second end, and a longitudinal axis. The longitudinal axis of center section is coincident with that of nozzle 83. First end is the upstream end of center section. First end may be cylindrical shaped or conical shaped. Second end is the downstream end of center section. Second end has a conical shaped end that tapers in the same direction as nozzle 83 as depicted. This specialized shape of nozzle 83 helps curtail sonic conditions in the refrigerant.

Figure 11:
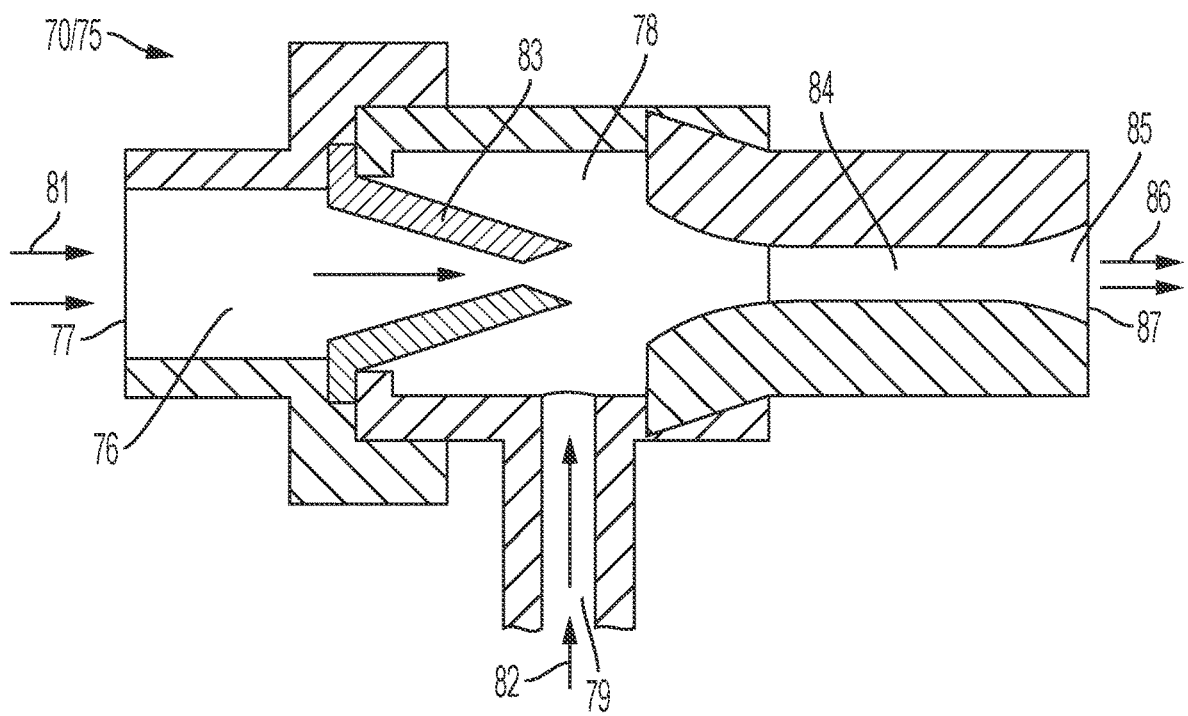
FIG. 11 is a cross sectional view of a specialized ejector.

First or second ejector 70,75 may include a nozzle 83 with a specialized shape as depicted in FIG. 11. Nozzle 83 with specialized shape includes a reverse tapered small end. In this configuration, the small end of nozzle 83 is not formed or cut with an edge that runs perpendicular to the longitudinal axis of nozzle 83. But rather, the small end of nozzle 83 is formed or cut with an edge that runs at a non-perpendicular angle with the longitudinal axis of nozzle 83. The tapered angle of edge runs in the opposite direction of the taper on nozzle 83 as depicted. This specialized shape of nozzle 83 helps curtail sonic conditions in the refrigerant.

Figure 12:
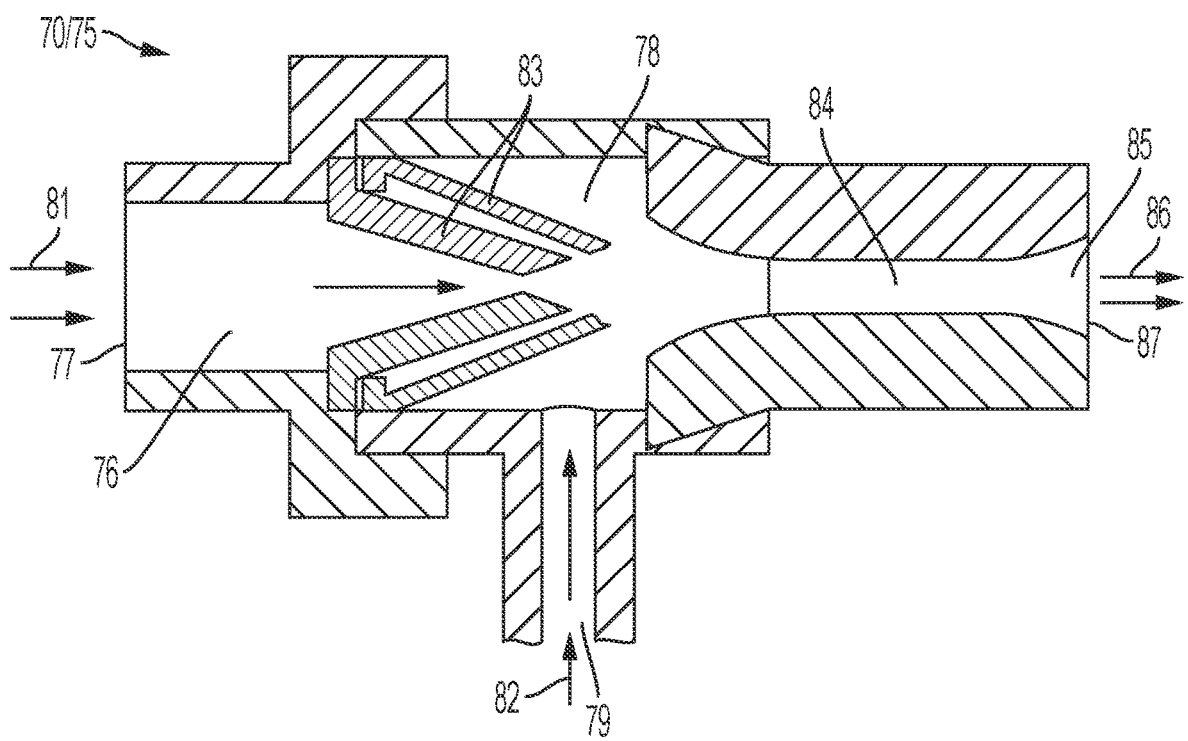
FIG. 12 is a cross sectional view of a specialized ejector.

First or second ejector 70,75 may include a nozzle 83 with a specialized shape as depicted in FIG. 12. Nozzle 83 with specialized shape includes a dual walled nozzle body with a reverse tapered small end. In this configuration, nozzle 83 has a dual paned or dual walled body. Nozzle 83 does not have a single pane or single walled body. But rather, nozzle 83 has a dual paned or dual walled body as depicted. Dual panes or dual walls create an additional chamber within nozzle 83. Additional chamber is a conical shaped chamber. Additional chamber has an upstream end and a downstream end. The upstream end of additional chamber is closed and the downstream end is open as depicted. Refrigerant may flow in and out of additional chamber through open downstream end. Also, the small end of nozzle 83 is not formed or cut with an edge that runs perpendicular to the longitudinal axis of nozzle 83. But rather, the small end of nozzle 83 is formed or cut with an edge that runs at a non-perpendicular angle with the longitudinal axis of nozzle 83. The tapered angle of edge runs in the opposite direction of the taper on nozzle 83 as depicted. The open downstream end of additional chamber is positioned along this taper and thus is tapered. This specialized shape of nozzle 83 helps curtail sonic conditions in the refrigerant.

Figure 5:
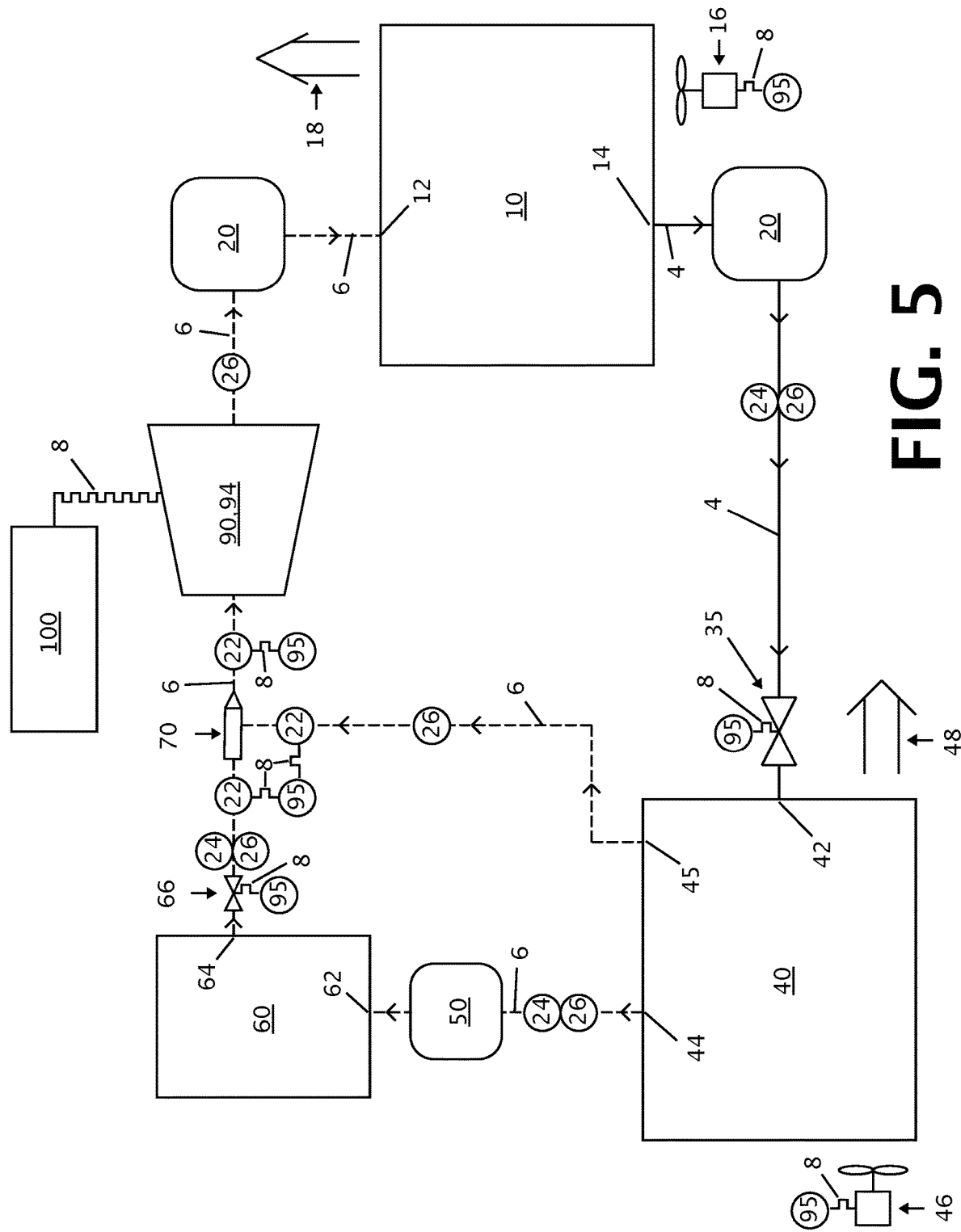
FIG. 5 is a diagram of a plurality of modes of refrigeration cycle ejector power generator with one ejector and additional refrigeration cycle components.
Figure 6:
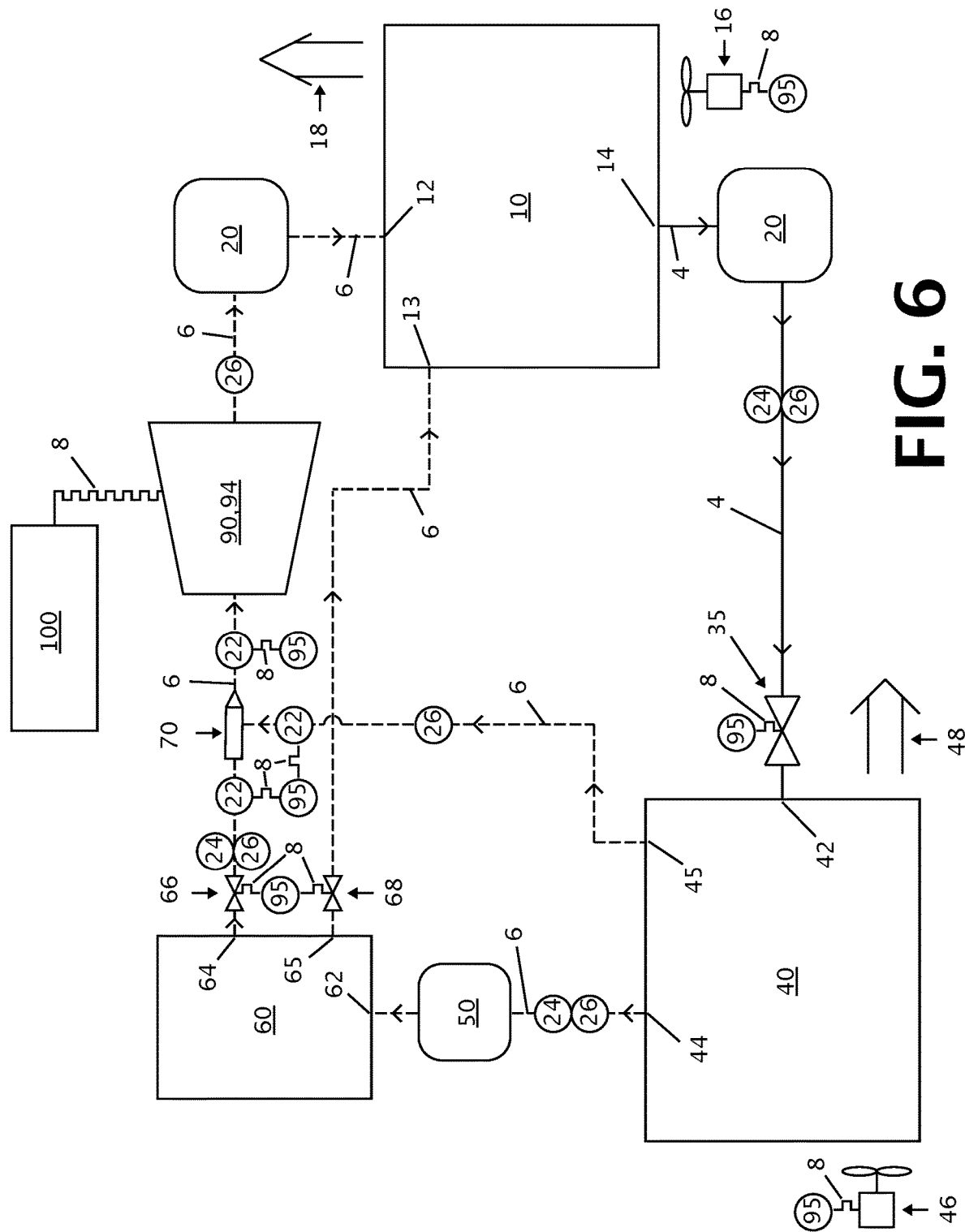
FIG. 6 is a diagram of a plurality of modes of refrigeration cycle ejector power generator with one ejector, a condenser bypass valve, and additional refrigeration cycle components.
Figure 7:
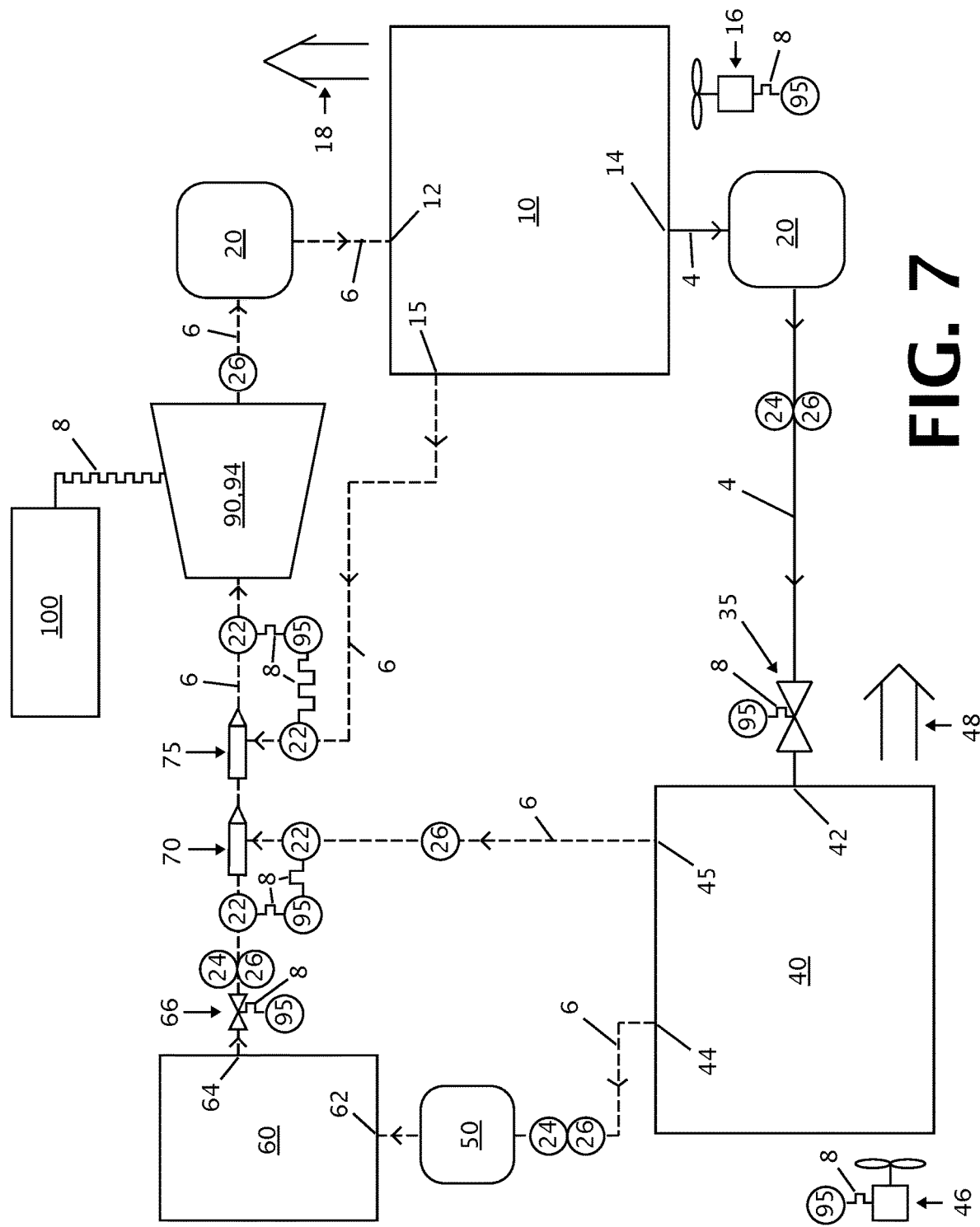
FIG. 7 is a diagram of a plurality of modes of refrigeration cycle ejector power generator with two ejectors and additional refrigeration cycle components.
Figure 8:
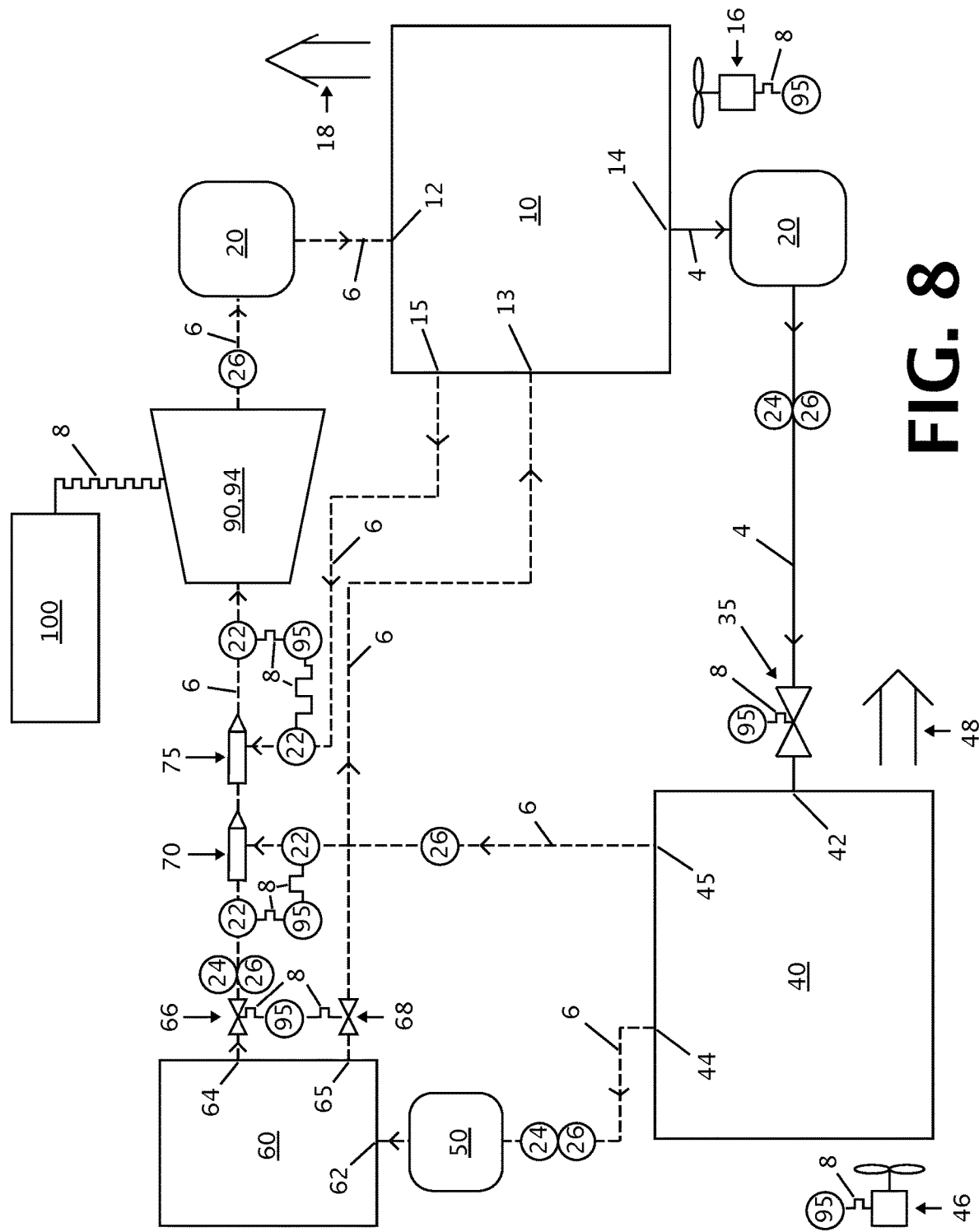
FIG. 8 is a diagram of a plurality of modes of refrigeration cycle ejector power generator with two ejectors, a condenser bypass valve, and additional refrigeration cycle components.
Figure 9:
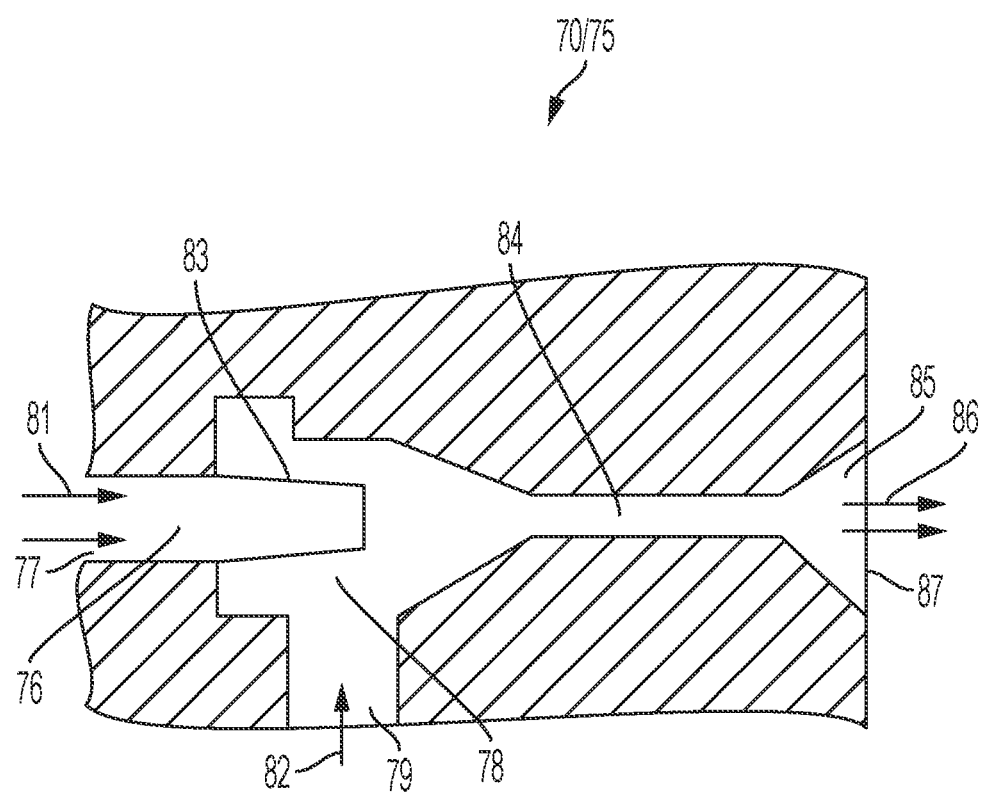
FIG. 9 is a cross sectional view of an ejector.

Refrigeration cycle ejector power generator 2 may further comprise a plurality of pressure transmitters 22. A pressure transmitter is an electromechanical device that converts a mechanical pressure reading value into a proportional electrical signal. A pressure transmitter continuously reads pressure and transmits an electrical signal containing the pressure reading. Each pressure transmitter 22 may be any known type of pressure transmitter that can withstand very high pressures ranging from 74 atmospheres and above. Each pressure transmitter 22 is connected to controller or computer 95 by electrical wiring 8 to create electrical continuity there between. Controller or computer 95 receives electrical signals from each pressure transmitter 22 through electrical wiring 8. Controller or computer 95 uses the pressure readings from each pressure transmitter 22 in order to help control the flow of refrigerant in the refrigeration cycle by opening and closing expansion valve 35, ejector valve 66, and condenser bypass valve 68. With single ejector best modes, a pressure transmitter 22 is positioned at: the high pressure influent refrigerant 81 of first ejector 70, the low pressure influent refrigerant 81 of first ejector 70, and the effluent refrigerant 86 of first ejector 70, as depicted in FIGS. 5-6. With double ejector best modes, a pressure transmitter 22 is positioned at: the high pressure influent refrigerant 81 of first ejector 70, the low pressure influent refrigerant 81 of first ejector 70, the high pressure influent refrigerant 81 of second ejector 75, the low pressure influent refrigerant 81 of first ejector 75, and the effluent refrigerant 86 of second ejector 75, as depicted in FIGS. 7-8.

Refrigeration cycle ejector power generator 2 may further comprise a plurality of pressure gauges 24. A pressure gauge is a device that measures refrigerant pressure. Each pressure gauge 24 may be any known type of pressure gauge that can withstand very high pressures ranging from 74 atmospheres and above. Pressure gauges 24 may be positioned at various locations in the refrigeration cycle as depicted in FIGS. 5-8.

Refrigeration cycle ejector power generator 2 may further comprise a plurality of temperature gauges 26. A temperature gauge is a device that measures refrigerant temperature. Each temperature gauge 26 may be any known type of temperature gauge that can withstand very high pressures ranging from 74 atmospheres and above. Temperature gauges 26 may be positioned at various locations in the refrigeration cycle as depicted in FIGS. 5-8.

Refrigeration cycle ejector power generator 2 may further comprise one or more separators 20. A separator 20 is a vessel that functions to separate contaminants from the refrigerant, such as water, oil, air, dirt, etc., and to prevent the flow of contaminants in the refrigeration cycle. A separator 20 may be positioned in the refrigeration cycle between condenser 10 and evaporator 40 and/or between the turbine 90 and the condenser 10, as depicted in FIGS. 5-8. Each separator 20 may be any known type of separator. Separator 20 must be capable of containing refrigerant under very high pressures ranging from 74 atmospheres and above.

Refrigeration cycle ejector power generator 2 may further comprise an accumulator 50. Accumulator 50 is a vessel that functions to separate liquid refrigerant from gaseous refrigerant to prevent the flow of liquid refrigerant into compressor 60. An accumulator 50 may be positioned in the refrigeration cycle between evaporator 40 and compressor 60, as depicted in FIGS. 5-8. Accumulator 50 may be any known type of accumulator. Accumulator 50 must be capable of containing refrigerant under very high pressures ranging from 74 atmospheres and above.

Each of the following claims pertains to subject matter presented in the corresponding figure number. Thus, claim 1 pertains to subject matter depicted in FIG. 1. Claim 2 pertains to subject matter depicted in FIG. 2, and so on.

What is claimed is:

1. A refrigeration cycle ejector power generator comprising: a condenser; an expansion valve; an evaporator; a compressor; an ejector valve; a first ejector; a turbine; a plurality of piping or tubing; and a controller or computer, wherein,
   said condenser is a containment vessel with a primary entry port, a primary exit port, and a heat exchanger, radiator, or coil,
   said expansion valve is a metering valve or throttle valve with an entry port and an exit port,
   said evaporator is a containment vessel with a primary entry port, a primary exit port, a secondary exit port, and a heat exchanger, radiator, or coil,
   said compressor is a containment vessel with a primary entry port, a primary exit port, and a pump,
   said ejector valve is an actuated valve with an entry port and an exit port,
   said first ejector is an ejector with a primary entry port, a high pressure chamber, a secondary entry port, a low pressure chamber, a nozzle, a mixing chamber, a diffuser, and an exit port,
   said turbine is a containment vessel or sealed vessel with a fan, a fan shaft, a fan shaft seal, an entry port, and an exit port,
   said fan shaft has a first end and a second end,
   said controller or computer is an integrated circuit with a central processing unit and memory,
   said primary exit port on said condenser is connected by said plurality of piping or tubing to said entry port on said expansion valve,
   said exit port on said expansion valve is connected by said plurality of piping or tubing to said primary entry port on said evaporator,
   said primary exit port on said evaporator is connected by said plurality of piping or tubing to said primary entry port on said compressor,
   said secondary exit port on said evaporator is connected by said plurality of piping or tubing to said secondary entry port on said first ejector,
   said primary exit port on said compressor is connected by said plurality of piping or tubing to said entry port on said ejector valve,
   said exit port on said ejector valve is connected by said plurality of piping or tubing to said primary entry port on said first ejector,
   said exit port on said first ejector is connected by said plurality of piping or tubing to said entry port on said turbine,
   said fan on said turbine is located within said containment vessel or sealed vessel of said turbine,
   said first end of said fan shaft is located within said containment vessel or sealed vessel of said turbine,
   said second end of said fan shaft is located outside of said containment vessel or sealed vessel of said turbine,
   said fan shaft seal is a seal or bearing attached to said fan shaft between said first end and said second end of said fan shaft,
   said fan on said turbine is rigidly attached to said first end of said fan shaft,
   said exit port on said turbine is connected by said plurality of piping or tubing to said primary entry port on said condenser, and
   said ejector valve is connected by electrical wiring to said controller or computer.

2. A refrigeration cycle ejector power generator as recited in claim 1 further comprising a condenser bypass valve, wherein,
   said condenser has a secondary entry port,
   said compressor has a secondary exit port,
   said condenser bypass valve is an actuated valve with an entry port and an exit port,
   said secondary exit port on said compressor is connected by said plurality of piping or tubing to said entry port on said condenser bypass valve,
   said exit port on said condenser bypass valve is connected by said plurality of piping or tubing to said secondary entry port on said condenser, and
   said condenser bypass valve is connected by electrical wiring to said controller or computer.

3. A refrigeration cycle ejector power generator comprising: a condenser; an expansion valve; an evaporator; a compressor; an ejector valve; a first ejector; a second ejector; a turbine; a plurality of piping or tubing; and a controller or computer, wherein,
   said condenser is a containment vessel with a primary entry port, a primary exit port, a secondary exit port, and a heat exchanger, radiator, or coil,
   said expansion valve is a metering valve or throttle valve with an entry port and an exit port,
   said evaporator is a containment vessel with a primary entry port, a primary exit port, a secondary exit port, and a heat exchanger, radiator, or coil, said compressor is a containment vessel with a primary entry port, a primary exit port, and a pump, said ejector valve is an actuated valve with an entry port and an exit port, said first ejector is an ejector with a primary entry port, a high pressure chamber, a secondary entry port, a low pressure chamber, a nozzle, a mixing chamber, a diffuser, and an exit port, said second ejector is an ejector with a primary entry port, a high pressure chamber, a secondary entry port, a low pressure chamber, a nozzle, a mixing chamber, a diffuser, and an exit port, said turbine is a containment vessel with a fan, a fan shaft, a fan shaft seal, an entry port, and an exit port, said fan shaft has a first end and a second end, said controller or computer is an integrated circuit with a central processing unit and memory, said primary exit port on said condenser is connected by said plurality of piping or tubing to said entry port on said expansion valve, said exit port on said expansion valve is connected by said plurality of piping or tubing to said primary entry port on said evaporator, said primary exit port on said evaporator is connected by said plurality of piping or tubing to said primary entry port on said compressor, said secondary exit port on said evaporator is connected by said plurality of piping or tubing to said secondary entry port on said first ejector, said primary exit port on said compressor is connected by said plurality of piping or tubing to said entry port on said ejector valve, said exit port on said ejector valve is connected by said plurality of piping or tubing to said primary entry port on said first ejector, said exit port on said first ejector is connected by said plurality of piping or tubing to said primary entry port on said second ejector, said secondary exit port on said condenser is connected by said plurality of piping or tubing to said secondary entry port on said second ejector, said exit port on said second ejector is connected by said plurality of piping or tubing to said entry port on said turbine, said fan on said turbine is located within said containment vessel or sealed vessel of said turbine, said first end of said fan shaft is located within said containment vessel or sealed vessel of said turbine, said second end of said fan shaft is located outside of said containment vessel or sealed vessel of said turbine, said fan shaft seal is a seal or bearing attached to said fan shaft between said first end and said second end of said fan shaft, said fan on said turbine is rigidly attached to said first end of said fan shaft, said exit port on said turbine is connected by said plurality of piping or tubing to said primary entry port on said condenser, and said ejector valve is connected by electrical wiring to said controller or computer.

4. A refrigeration cycle ejector power generator as recited in claim 3 further comprising a condenser bypass valve, wherein, said condenser has a secondary entry port, said compressor has a secondary exit port, said condenser bypass valve is an actuated valve with an entry port and an exit port, said secondary exit port on said compressor is connected by said plurality of piping or tubing to said entry port on said condenser bypass valve, said exit port on said condenser bypass valve is connected by said plurality of piping or tubing to said secondary entry port on said condenser, and said condenser bypass valve is connected by electrical wiring to said controller or computer.

5. A refrigeration cycle ejector power generator as recited in claim 1 further comprising: a first pressure transmitter; a second pressure transmitter; and a third pressure transmitter, wherein, said first, second, and third pressure transmitters are each a pressure transmitter, said first, second, and third pressure transmitters are each connected by electrical wiring to said controller or computer, said first pressure transmitter is installed within said plurality of piping or tubing connecting said ejector valve to said first ejector, said second pressure transmitter is installed within said plurality of piping or tubing connecting said secondary exit port on said evaporator to said secondary entry port on said first ejector, and said third pressure transmitter is installed within said plurality of piping or tubing connecting said exit port on said first ejector to said entry port on said turbine.

6. A refrigeration cycle ejector power generator as recited in claim 2 further comprising: a first pressure transmitter; a second pressure transmitter; and a third pressure transmitter, wherein, said first, second, and third pressure transmitters are each a pressure transmitter, said first, second, and third pressure transmitters are each connected by electrical wiring to said controller or computer, said first pressure transmitter is installed within said plurality of piping or tubing connecting said ejector valve to said first ejector, said second pressure transmitter is installed within said plurality of piping or tubing connecting said secondary exit port on said evaporator to said secondary entry port on said first ejector, and said third pressure transmitter is installed within said plurality of piping or tubing connecting said exit port on said first ejector to said entry port on said turbine.

7. A refrigeration cycle ejector power generator as recited in claim 3 further comprising: a first pressure transmitter; a second pressure transmitter; a third pressure transmitter, and a fourth pressure transmitter, wherein, said first, second, third, and fourth pressure transmitters are each a pressure transmitter, said first, second, third, and fourth pressure transmitters are each connected by electrical wiring to said controller or computer, said first pressure transmitter is installed within said plurality of piping or tubing connecting said ejector valve to said first ejector, said second pressure transmitter is installed within said plurality of piping or tubing connecting said secondary exit port on said evaporator to said secondary entry port on said first ejector, said third pressure transmitter is installed within said plurality of piping or tubing connecting said exit port on said first ejector to said entry port on said turbine, and said fourth pressure transmitter is installed within said plurality of piping or tubing connecting said secondary exit port on said condenser to said secondary entry port on said second.

8. A refrigeration cycle ejector power generator as recited in claim 4 further comprising: a first pressure transmitter; a second pressure transmitter; a third pressure transmitter, and a fourth pressure transmitter, wherein, said first, second, third, and fourth pressure transmitters are each a pressure transmitter, said first, second, third, and fourth pressure transmitters are each connected by electrical wiring to said controller or computer, said first pressure transmitter is installed within said plurality of piping or tubing connecting said ejector valve to said first ejector, said second pressure transmitter is installed within said plurality of piping or tubing connecting said secondary exit port on said evaporator to said secondary entry port on said first ejector, said third pressure transmitter is installed within said plurality of piping or tubing connecting said exit port on said first ejector to said entry port on said turbine, and said fourth pressure transmitter is installed within said plurality of piping or tubing connecting said secondary exit port on said condenser to said secondary entry port on said second ejector.

\* \* \* \* \*